(12) United States Patent
Frey et al.

(10) Patent No.: US 6,314,940 B1
(45) Date of Patent: Nov. 13, 2001

(54) FUEL FEED SYSTEM FOR A SPARK-IGNITION INTERNAL COMBUSTION ENGINE AND A METHOD OF OPERATING SUCH AN INTERNAL COMBUSTION ENGINE

(75) Inventors: Juergen Frey; Guenter Karl, both of Esslingen; Stephan Kraemer, Schwaikheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/523,245

(22) Filed: Mar. 10, 2000

(30) Foreign Application Priority Data

Mar. 23, 1999 (DE) ............................................. 199 12 892
Sep. 23, 1999 (DE) ............................................. 199 45 544

(51) Int. Cl.[7] ....................................................... F02B 7/00
(52) U.S. Cl. ........................................... 123/431; 123/430
(58) Field of Search .................................. 123/430, 431, 123/295, 531, 533

(56) References Cited

U.S. PATENT DOCUMENTS

| | | | | |
|---|---|---|---|---|
| 3,924,598 | * | 12/1975 | Davis | 123/431 |
| 4,031,867 | * | 6/1977 | Yasuda et al. | 123/431 |
| 5,081,969 | | 1/1992 | Long, III . | |
| 5,113,829 | | 5/1992 | Motoyama . | |
| 5,251,582 | | 10/1993 | Mochizuki . | |
| 5,291,865 | * | 3/1994 | Sasaki | 123/431 |
| 5,357,925 | * | 10/1994 | Sasaki | 123/431 |
| 5,875,743 | | 3/1999 | Dickey . | |
| 6,032,640 | * | 3/2000 | Evans | 123/431 |

FOREIGN PATENT DOCUMENTS

| | | |
|---|---|---|
| 195 48 526 A1 | 7/1997 | (DE) . |
| 0 308 467 A | 3/1989 | (EP) . |
| 308 467 B1 | 12/1993 | (EP) . |
| 0 849 455 A2 | 6/1998 | (EP) . |
| 56-151213 * | 11/1981 | (JP) ................. 123/431 |

OTHER PUBLICATIONS

SAE Paper 98P–136, 1998 Rodney Houston—Combustion And Emissions Characteristics of Orbital's Combustion Process Applied to Multi–Cylinder Automotive Direct Injected 4–Stroke Engines.

* cited by examiner

Primary Examiner—John Kwon
(74) Attorney, Agent, or Firm—Klaus J. Bach

(57) ABSTRACT

In a fuel feed system for a spark-ignition internal combustion engine, which system has at least a first injection valve, which is arranged in or on a cylinder head and to which fuel is fed under pressure for discharging directly into a combustion chamber of the internal combustion engine, at least one further injection valve is provided in an engine intake passage to discharge, in certain operating ranges of the internal combustion engine, fuel into the intake passage of the internal combustion engine in addition to the discharge of the fuel of the first injection valve into the cylinder, and the first injection valve is designed for fuel injection volume lower than that required for full power operation of the engine.

10 Claims, 3 Drawing Sheets

FUEL FEED SYSTEM FOR A SPARK-IGNITION INTERNAL COMBUSTION ENGINE AND A METHOD OF OPERATING SUCH AN INTERNAL COMBUSTION ENGINE

BACKGROUND OF THE INVENTION

The invention relates to a fuel feed system for a spark-ignition internal combustion engine including a direct fuel injection valve mounted on a cylinder head for injecting fuel and to a method of operating an internal combustion engine with such a fuel feed system.

The prior art already includes a fuel feed system (EP 0 308 467B1) which has a common rail which is attached to a cylinder head and which carries both fuel and air under pressure to blow-in valves accommodated in the cylinder head. For this purpose, corresponding fuel lines and air lines to the blow-in valves are provided in the common rail. Each blow-in valve has an electromagnetically actuable fuel injection valve of conventional construction which can discharge fuel into a mixture formation chamber provided within the blow-in valve. The fuel in the mixture formation chamber is then prepared with compressed air and partially vaporized in the mixture formation chamber. The fuel prepared in this way passes on into a discharge zone of the blow-in valve which has an electromagnetically actuable valve. In an open position of a valve-closing body of the electromagnetically actuable valve of the discharge zone, the fuel/air mixture in the mixture formation chamber is then blown out directly into the combustion chamber from an outlet opening of the blow-in valve at a relatively low pressure of, for example, 7 to 8 bar. The common rail is provided for supplying the blow-in valves with both fuel and air.

However, if large injection quantities are demanded from the known fuel feed system or from the blow-in valve, as is the case, for example, with high engine loads, there may be problems with the quality of mixture preparation since there is only a certain maximum quantity of fuel that the blow-in valve can prepare well. The same problems are also encountered with a fuel feed system which has direct-injection valves for direct petrol injection. Direct-injection valves discharge the fuel directly at a relatively high pressure in the form of a cloud of fuel comprising extremely fine droplets into a combustion chamber of the internal combustion engine. If relatively large quantities of fuel are demanded, however, the fuel discharged by the direct-injection valve is not fully prepared and use of the air in the combustion chamber is not optimal. Complete preparation of the fuel/air mixture discharged by the blow-in valve cannot be achieved with blow-in valves either. All this means that wetting of the internal walls of the cylinder and of the piston surface with fuel can occur. However, this kind of thing leads to incomplete combustion of the fuel in the combustion chamber, leading to a rise in noxious components in the exhaust gas. Particularly affected by this are internal combustion engines which have pressure charging of the intake air, by means of an exhaust turbocharger for example, since, in relation to the cylinder volume, these internal combustion engines require relatively large quantities of injected fuel.

It is the object of the invention to provide a fuel feed system with which an optimum mixture preparation as regards consumption and exhaust emissions takes place in the internal combustion engine in all operating ranges.

SUMMARY OF THE INVENTION

In a fuel feed system for a spark-ignition internal combustion engine, which system has at least a first injection valve, which is arranged in or on a cylinder head and to which fuel is fed under pressure for discharging directly into a combustion chamber of the internal combustion engine, at least on further injection valve is provided in an engine intake passage to discharge in certain operating ranges of the internal combustion engine, fuel into the intake passage of the internal combustion engine in addition to the discharge of the fuel of the first injection valve into the cylinder, and the first injection valve is designed for fuel injection volume lower than that required for full power operation of the engine.

The fuel feed system according to the invention for a spark-ignition internal combustion engine according to the invention has the advantage that the internal combustion engine can provide high power outputs over the entire engine-speed range without a significant increase in the proportion of noxious components in the exhaust gas.

The fuel injection system according to the invention offers the possibility of feeding in the fuel required for mixture formation not only by direct discharge into the combustion chamber by means of the blow-in valve, as in one configuration, or by means of direct injection, as in the other embodiment provided, but also via the air intake passage of the internal combustion engine. In this arrangement, a control unit controls the valve associated with the combustion chamber (blow-in valve or direct-injection valve) and the additional injection valve in the intake passage as a function of the operating range of the internal combustion engine and determines their respective flow rates. It is particularly expedient here if the additional fuel supply via the intake passage is provided essentially in the higher load range of the internal combustion engine. Thanks to the upstream fuel supplied into the intake passage, the valve provided for direct fuel discharge into the combustion chamber can be [constructed with] designed for an advantageous minimum/maximum quantity ratio (spread) since the quantity of fuel to be discharge per operating cycle can be fed in along two paths. In this arrangement, a lowering of the fuel pressure in the case of exclusively direct discharge into the combustion chamber, which is detrimental particularly in the low-load range, is prevented, thus improving mixture formation particularly in the important low-load range. At the same time, the fuel feed system components required for feeding fuel directly into the combustion chamber can advantageously be designed for lower total mass flow rates at full load than was hitherto the case with exclusively direct injection of blowing in. This also reduces the lost power in the fuel pump and, in the case of pressure-charged internal combustion engines, in the compressor and therefore leads to a reduction in fuel consumption. In the fuel feed system according to the invention with a blow-in valve in the cylinder head, the air assisted fuel injection system can additionally be designed for elevated blow-in pressures (at least 10 bar), thereby allowing a wider choice for the blow-in instant.

It is particularly advantageous that, when the internal combustion engine is at time operated exclusively with the additional injection valve, an increase in temperature can be achieved at the blow-in valves or the direct-injection valves, since this valve is then no longer cooled by the fuel during such discharge-free time, with the result that any deposits which may be present are then broken down by the rise in temperature which occurs at the blow-in valves or direct-injection valves.

Advantageous embodiments of the fuel feed system, for a spark ignition internal combustion engine will be described below in greater on the basis of the drawings:

DESCRIPTION OF THE PREFERRED EMBODIMENTS

Figure 1:
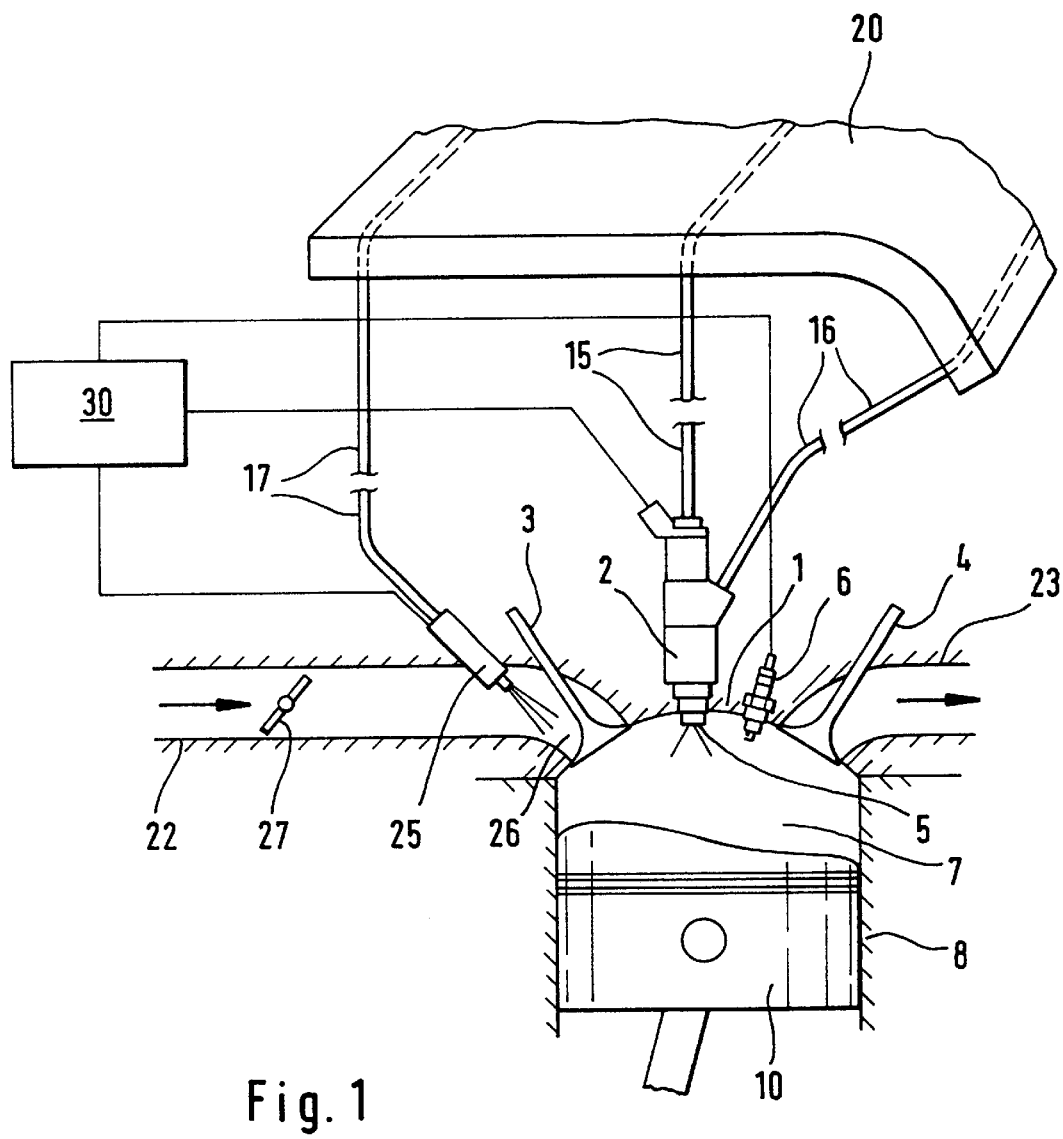
FIG. 1 shows a partial section through an internal combustion engine with a fuel feed system in accordance with a first illustrative embodiment according to the invention.

FIG. 1 shows a section through an internal combustion engine in accordance with a first illustrative embodiment according to the invention. The internal combustion engine has a cylinder head 1, in which a blow-in fuel injection valve 2 is accommodated. In a known manner, the blow-in fuel injection valve 2 has an electromagnetically actuable fuel injection valve (not shown specifically) which can discharge fuel into a mixture formation chamber or into mixture formation zone within the blow-in valve 2. In the mixture formation chamber or mixture formation zone, the fuel discharged by the fuel injection valve (not shown specifically) and a gaseous medium fed into the mixture formation chamber or mixture formation zone under pressure are then mixed in order, in this way, to enable the fuel in the mixture formation chamber or mixture formation zone to be partially vaporized. The fuel prepared in this way then passes in the form of a fuel/medium mixture, under the control of another electromagnetically or piezoelectrically actuable valve (not shown specifically), out of an outlet opening 5 of the blow-in valve 2 and directly into the combustion chamber 7 of a cylinder 8 of the internal combustion engine. A piston 10 is accommodated in a known manner in the cylinder 8 so as to be able to move. A spark plug 6 is provided to ignite the fuel/medium mixture enclosed in the combustion chamber 7. Th gaseous medium can be air or air mixed with exhaust gas or even air mixed with fuel. This is therefore an internal combustion engine with internal mixture formation in conjunction with an air-assisted injection system. The construction and mode of operation of blow-in valves of this kind are also sufficiently well known to the person skilled in the art from SAE Paper 98P-136, 1988, Rodney Houston, Geoffrey Cathcart, Orbital Engine Company, Perth, Western Australia, "Combustion and Emissions Characteristics of Orbital's Combustion Process Applied to Multi-Cylinder Automotive Direct Injected 4-Stroke Engines", pages 1–12, for example.

Fuel is fed to the blow-in valve 2 at a fuel connection 15 of the blow-in valve 2, via a fuel/air rail 20 for example. In the fuel/air rail 20, fuel is pumped out of a fuel tank (not shown specifically) by means of a fuel pump (not shown specifically). The gaseous medium is fed to the blow-in valve 2 at a medium connection 16 of the blow-in valve 2, likewise via the fuel/air rail 20 for example. The gaseous medium is fed by means of a compressor (not shown specifically) into the fuel/air rail 20, which distributes the compressed medium to the individual blow-in valves 2.

The combustion chamber 7 is bounded by the piston 10 and the cylinder head 1. During the intake stroke, air is drawn into the combustion chamber 7 from an intake pipe 22 via, for example, a single inlet valve 3 of the internal combustion engine. After combustion, the exhaust gases are discharged into an exhaust pipe 23, via a single exhaust valve 4 for example. It is, of course, possible that more inlet valves 3 and two or more exhaust valves 4 are provided per cylinder 8.

The internal combustion engine can be a pressure-charged internal combustion engine, in which air is fed into the intake pipe 22 of the internal combustion engine under pressure. For this purpose, use can be made, for example, of an exhaust turbocharger.

According to the invention, the internal combustion engine has at least one additional injection valve 25, which can discharge fuel into an intake zone 26 of the internal combustion engine. The additional injection valve 25 can be a conventional and, for example, electromagnetically actuable low-pressure injection valve 25 of known construction. The intake zone 26 is formed by the interior of the intake pipe 22, in which air and the fuel discharged by the additional injection valve 25 can flow into the combustion chamber 7 when the inlet valve 3 is open. The additional injection valve 25 discharges the fuel in the direction of the inlet valve 3 of the internal combustion engine for example. The additional injection valve is located, for example, downstream of a throttle valve 27 accommodated rotatably in the intake pipe 22 and, to allow fuel to be supplied to it, is, for example, also connected to the fuel/air rail 20 via its fuel connection 17. It is possible to provide an additional injection valve 25 for each cylinder 8 of the internal combustion engine. These can be arranged directly in the inlet ports. This method of injection is sufficiently well known to the person skilled in the art under the term multi-point injection. However, it is also possible to provide just a single additional injection valve 25 for all, or at least some, of the cylinders 8 of a multi-cylinder internal combustion engine. In this case, the additional injection valve 25 discharges the fuel into an unbranched part of the intake pipe 22, upstream of a point where the intake pipe 22 branches off to the individual cylinders 8, and the fuel is then distributed uniformly in the branches to the individual cylinders 8. This method of injection is known to the person skilled in the art under the term single-point injection.

According to the invention, the discharge of fuel by means of the additional injection valve 25 is provided in addition to the discharge of the fuel/medium mixture by means of the blow-in valve 2. Here, the discharge of additional fuel by means of the additional injection valve 25 is provided essentially in the upper part-load range up to and including the full load of the internal combustion engine. The additional discharge of fuel can be carried out over the entire speed range of the internal combustion engine as soon as higher loads are demanded of the internal combustion engine. Control of the discharge of fuel by the additional injection valve 25 and the blow-in valve 2 can be carried out by means of an electronic control unit 30 as a function of operating parameters of the internal combustion engine. However, provision is also made to operate the internal combustion engine at times solely by discharging fuel by means of the additional injection valve 25. During this time, the blow-in valve 2 does not discharge any fuel/medium mixture, with the result that the blow-in valve 2 does not have fuel flowing through it and cooling it, resulting in an increase in temperature at the blow-in valve 2 due to the continuation of combustion in the combustion chamber 7. Operating at times solely with the additional injection valve 25 allows deposits to be cleaned off the blow-in valve 2 since carbon deposits or the like are then burnt off by the relatively high temperature at the blow-in valve 2. Operation of the internal combustion engine with the exclusive supply of fuel can be carried out at intervals for predetermined cleaning periods irrespective of the particular load range.

Figure 2:
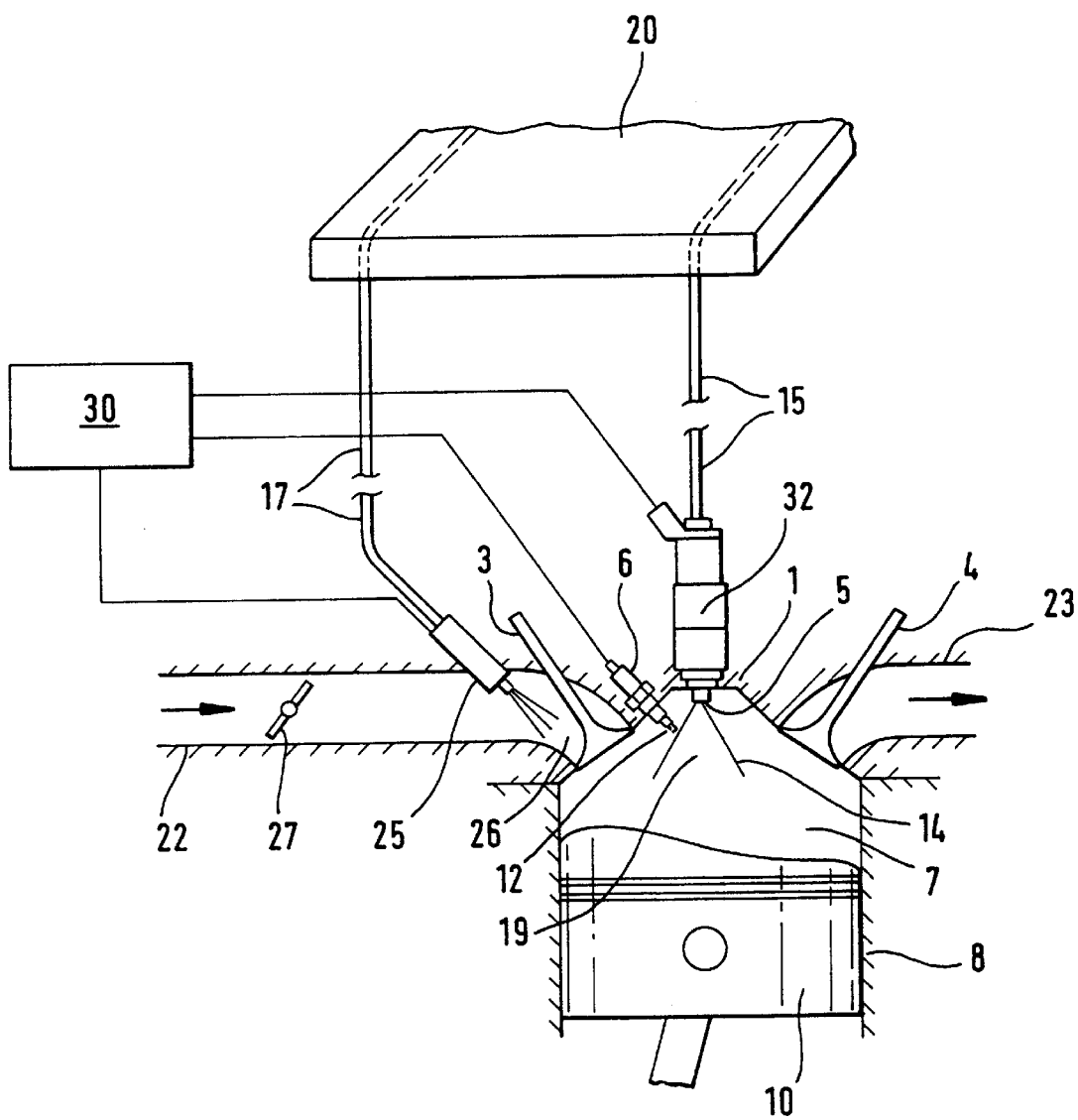
FIG. 2 shows a partial section through an internal combustion engine with a fuel feed system in accordance with a second illustrative embodiment according to the invention.

FIG. 2 shows a section through an internal combustion engine in accordance with a second illustrative embodiment according to the invention, in which all parts which are the same or have the same action are indicated by the same reference numerals as in the first illustrative embodiment shown in FIG. 1. As a modification to the first illustrative embodiment, the internal combustion engine does not have a blow-in valve 2 but is fitted with a direct-injection valve 32 for direct fuel injection instead of the blow-in valve 2. Additional fuel is here discharged by means of the additional injection valve 25 in the same way s in the first illustrative embodiment. In the case of the direct-injection valve 32, the fuel is discharged directly into the combustion chamber 7 of the cylinder 8 of the internal combustion engine at a relatively. high pressure of about 70 bar or above in the form of a cloud of fuel comprising extremely fine droplets. The fuel introduced into th combustion chamber 7 is ignited in a known manner by means of the spark plug 6. The ignition electrodes 12 of the spark plug are in this case located in the immediate vicinity of an outer edge 14 of a conical jet 19 discharged by the direct-injection valve 32 or are located partially in the conical jet 19. The conical jet 19 can be a hollow-cone jet or a solid-cone jet. In this arrangement, the direct-injection valve can be electromagnetically or piezo-electrically actuable. The construction and mode of operation of valves 32 of this kind is known to the person skilled in the art from DE 195 48 526A1, for example. It is also possible, in contrast to the illustration in FIG. 2, to arranged the direct-injection valve 32 laterally rather than centrally, providing for lateral fuel injection into the combustion chamber 7. In this case, the spark plug is located in, for example, a central position, in particular a vertical position, in the combustion chamber 7.

If a direct-injection valve 32 is used, the medium connection 16 in FIG. 1 can be omitted since valves of this kind require only a fuel connection 15. Here too, as with the blow-in valve 2 described, a common rail 20 can be provided to supply fuel to the individual direct-injection valves 32.

Figure 3:
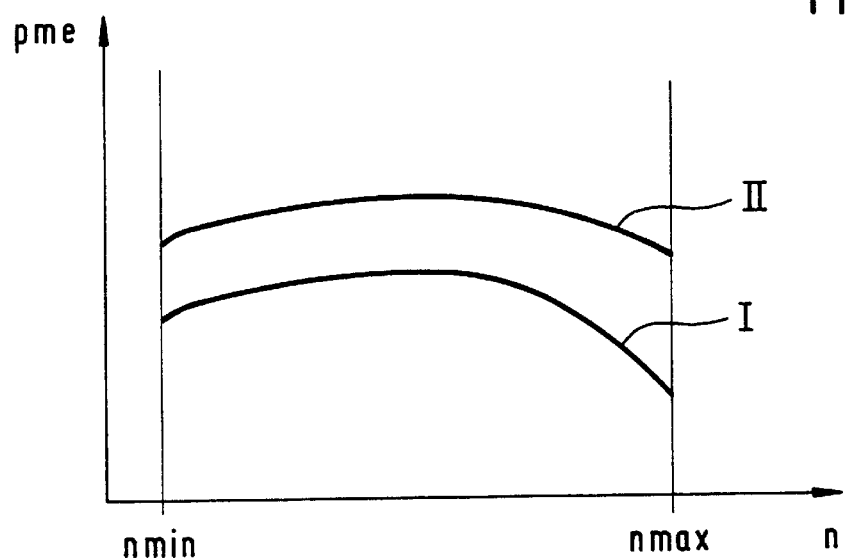
FIG. 3 shows a diagram of the power output by the internal combustion engine plotted against engine speed.

FIG. 3 shows a diagram representing the power output pme of the internal combustion engine plotted against the engine speed n. nmin here represents the minimum speed and nmax the maximum speed of the internal combustion engine. The line I shows the variation in the maximum possible power output of the internal combustion engine which can be achieved when fuel is discharged using only the blow-in valve 2 or when it is discharged using only the direct-injection valve 32. The line II shows the variation in the maximum possible power output of the internal combustion engine, which is possible with discharge of fuel/medium mixture by the blow-in valve 2 or by the direct-injection valve 32 and with additional intake-pipe injection by means of the additional injection valve 25. As the line II shows, it is possible to achieve an increase in the power of the internal combustion engine which is essentially uniform over the engine-speed range with additional injection by the additional injection valve 25.

The fuel feed system according to the invention provides two methods of mixture formation for operating the internal combustion engine, namely, on the one hand, internal mixture formation with direct fuel discharge into the combustion chamber and, on the other hand, supply of mixture prepared outside the combustion chamber by means of intake pipe fuel injection. Combining these methods of mixture formation makes it possible to achieve optimum mixture formation in every operating range of the internal operating range of the internal combustion engine in terms of low pollutant emissions and low fuel consumption. In this context, feeding in additional mixture via the intake zone is provided particularly in higher load ranges. In the lower load ranges, internal mixture formation is preferred, stratified mixture formation being effected by metering in fuel during the compression stroke. In stratified-charge mode, it is possible to operate the internal combustion engine in a largely unthrottled manner wherein power output can be controlled by means of the quantity of fuel. In this case, advantages in terms of fuel consumption are achieved.

Figure 4:
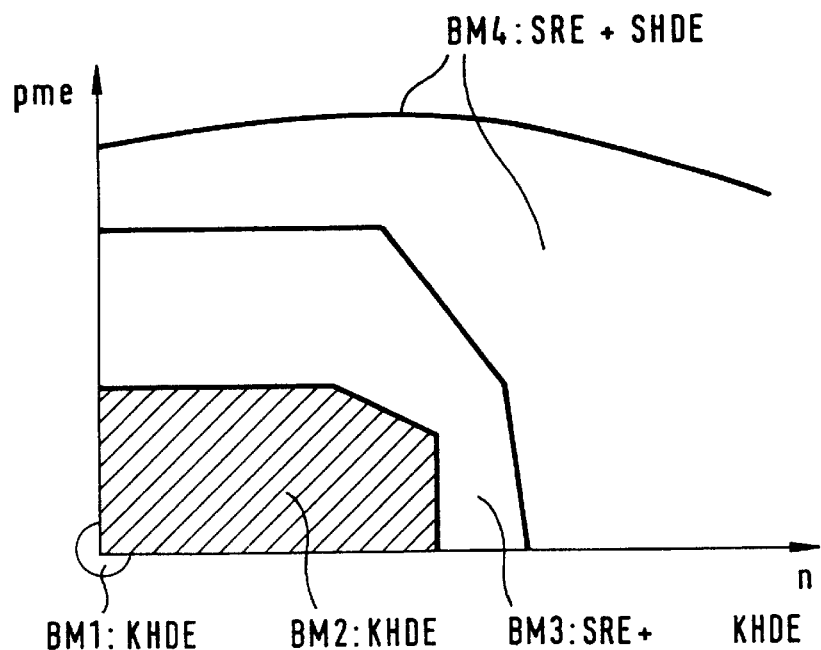
FIG. 4 shows a diagram of the operating ranges of the internal combustion engine in different operating modes.

In a diagram showing the fuel quantity pme plotted against the speed n of the internal combustion engine, FIG. 4 shows an example of various operating modes of the internal combustion engine, in which internal mixture formation KHDE, SHDE and intake-pipe injection SRE are combined in accordance with the load range. In the idling range BM1 and in the low-load range BM2 of the internal combustion engine, stratified-charge operation with internal mixture formation is provided. In stratified-charge mode, a stratified cloud of mixture with local differences in fuel concentration is formed in the combustion chamber. The cloud of mixture is ignited in a local area containing an ignitable mixture composition, whereby overall the internal combustion engine is operated with lean mixture formation and low fuel consumption.

In the middle load range BM3, provision is made for a lean homogeneous mixture to be fed via the intake zone of the internal combustion engine in addition to internal mixture formation. The mixture formed by intake-pipe injection SRE by means of the additional injection valve is enriched to give an ignitable mixture in the combustion chamber by the directly introduced quantity of fuel. The direct discharge of fuel by means of fuel injection or blowing in of mixture takes place during the compression stroke KHDE, just before the ignition instant. The valve associated directly with the combustion chamber, i.e. the blow-in valve or the direct-injection valve, is thus used to inject a quantity of fuel for local mixture enrichment for the purpose of ignition. In the middle load range BM3, very lean combustion in combination with late initiation of ignition is thus possible. A further reduction in the concentration of the mixture is achieved by pressure charging. By combining mixture formation by intake-pipe injection SRE and internal mixture formation by discharging fuel during the compression stroke KHDE, it is possible to achieve low $NO_x$ emissions similar to those that were only achievable by exhaust-gas recirculation with previous methods for internal mixture formation. With the fuel feed system according to the invention, it is thus possible to obtain advantages in nonsteady-state operation of the internal combustion engine by virtue of the reduction which is possible in the exhaust-gas recirculation rate or omission of exhaust-gas recirculation. In this operating mode BM3 of the internal combustion engine with combined mixture formation SRE+KHDE, there is furthermore a reduction in the temperature of the exhaust gas, thereby considerably increasing the effectiveness of exhaust-gas aftertreatment in the case of lean combustion.

In the high-load range BM4, mixture formation is performed by intake-pipe injection SRE and direct fuel discharge into the combustion chamber during the intake stroke SHDE, and a homogeneous mixture is formed in the combustion chamber. Another possibility here is to prepare the homogeneous combustion-chamber charge exclusively by means of intake-pipe injection SRE.

Combining intake-pipe injection and internal mixture formation also allows the engine to be operated in an emergency operating mode, stored in the control unit, if, in particular, the direct-injection valves fail. This gives additional assurance of reliable engine operation.

What is claimed is:

1. A fuel feed system for a spark ignition internal combustion engine including a cylinder with a piston movably disposed in said cylinder, a cylinder head covering said cylinder to form a combustion chamber between said piston and said cylinder head, a first fuel injection valve mounted in said cylinder head for directly injecting fuel into said combustion chamber, said cylinder head having gas intake and exhaust passages, and a second fuel injection valve mounted in said intake passage for injecting fuel into the intake air being supplied to said combustion chamber, said first and second injection valves being connected to an engine control unit for controlling the fuel supply to said combustion chamber by said first and second injection valves, said first injection valve being designed for a maximum fuel supply less than the maximum amount of fuel to said combustion chamber needed for full power operation of said engine to provide for greater controllability of the amount of fuel injected directly into said combustion chamber through said first injection valve, the rest of the fuel needed being supplied by said second fuel injection valve.

2. A fuel feed system according to claim 1, wherein said first fuel injection valve is a blow-in type valve to which fuel and a gaseous medium are fed under pressure for discharge as a fuel/medium mixture directly into the combustion chamber of said internal combustion engine.

3. A fuel feed system according to claim 1, wherein the internal combustion engine is a pressure-charged combustion engine, in which air is fed under pressure into the air intake of the internal combustion engine under pressure.

4. A fuel feed system according to claim 1, wherein a second fuel injection valve is provided in the intake passage of each cylinder of the internal combustion engine (multi-point injection).

5. A fuel feed system according to claim 1, wherein a common second injection valve is provided for all the cylinders of the internal combustion engine (single-point injection).

6. A method of operating a spark-ignition internal combustion engine including a cylinder with a piston movably disposed in said cylinder, a cylinder head covering said cylinder to form a combustion chamber between said piston and said cylinder head, a first fuel injection valve mounted in said cylinder head for directly injecting fuel into said combustion chamber, said cylinder head having gas intake and exhaust passages, and a second fuel injection valve mounted in said intake passage for injecting fuel into the intake air being supplied to said combustion chamber, said first and second injection valves being connected to an engine control unit for controlling the fuel supply to said combustion chamber by said first and second injection valves, said first injection valve being designed for a maximum fuel supply less than the maximum amount of fuel to said combustion chamber needed for full power operation of said engine to provide for greater controllability of the amount of fuel injected directly into said combustion chamber through said first injection valve, the rest of the fuel needed being supplied by said second fuel injection valve, wherein said first fuel injection valve for direct fuel injection and said second fuel injection valve for fuel injection into said intake passage are controlled by said control unit as a function of the momentary engine operating conditions, whereby their respective fuel supply rates are determined.

7. A method according to claim 6, wherein said second injection valve is operated over the full engine load range.

8. A method according to claim 6, wherein, during partial load operation, fuel is supplied to the combustion chamber directly by way of said first injection valve to provide for stratified charging of said combustion chamber, and at high engine loads, fuel is additionally supplied to said combustion chamber via said second injection valve disposed in said inlet passage.

9. A method according to claim 7, wherein, during medium load operation of said internal combustion engine, a lean mixture is formed in said intake passage by said second injection valve for filling said combustion chamber and a stratified ignitable mixture is formed in the combustion chamber by direct fuel injection through said first injection valve.

10. A method according to claim 7, wherein, when necessary, said internal combustion engine is operated exclusively with fuel supplied by said second valve to said intake passage for a cleaning period in which said first injection valve is fully shut down for heating said first injection valve and burning off any carbon deposits therefrom.

* * * * *